(12) United States Patent
Ikeda

(10) Patent No.: US 11,517,965 B2
(45) Date of Patent: Dec. 6, 2022

(54) CUTTING INSERT, CUTTING TOOL, AND METHOD OF MANUFACTURING MACHINED PRODUCT

(71) Applicant: KYOCERA CORPORATION, Kyoto (JP)

(72) Inventor: Yoshihito Ikeda, Ritto (JP)

(73) Assignee: KYOCERA Corporation, Kyoto (JP)

( * ) Notice: Subject to any disclaimer, the term of this patent is extended or adjusted under 35 U.S.C. 154(b) by 44 days.

(21) Appl. No.: 16/321,055

(22) PCT Filed: Jul. 26, 2017

(86) PCT No.: PCT/JP2017/027071
§ 371 (c)(1),
(2) Date: Jan. 28, 2019

(87) PCT Pub. No.: WO2018/021419
PCT Pub. Date: Feb. 1, 2018

(65) Prior Publication Data
US 2019/0168310 A1    Jun. 6, 2019

(30) Foreign Application Priority Data

Jul. 28, 2016 (JP) .............................. JP2016-148825

(51) Int. Cl.
*B23B 27/14* (2006.01)
(52) U.S. Cl.
CPC .... *B23B 27/145* (2013.01); *B23B 2200/0447* (2013.01); *B23B 2200/286* (2013.01); *B23B 2200/3654* (2013.01)

(58) Field of Classification Search
CPC ..... B23B 27/145; B23B 27/143; B23B 27/14; B23B 27/1611; B23B 27/1622;
(Continued)

(56) References Cited

U.S. PATENT DOCUMENTS 3,786,541 A * 1/1974 Lundgren ............. B23B 27/143
407/116
4,056,871 A * 11/1977 Bator .................... B23B 27/143
407/114
(Continued)

FOREIGN PATENT DOCUMENTS

JP     S62127702 U    8/1987
JP     2001038507 A   2/2001
(Continued)

*Primary Examiner* — Ryan Rufo
(74) *Attorney, Agent, or Firm* — Viering, Jentschura & Partner Mbb

(57) ABSTRACT

A cutting insert includes an upper surface and a cutting edge. The upper surface includes a first surface and a second surface which is located further inward than the first surface. The cutting edge includes a first cutting edge and a second cutting edge. The first surface includes a first region along the first cutting edge, a second region adjacent to the first region, and a third region which is adjacent to the second region and along the second cutting edge. The second surface includes a fourth region, a fifth region and a sixth region. A width of the second region is smaller than each of a width of the first region and a width of the third region. An inclination angle of the fifth region is smaller than each of an inclination angle of the fourth region and an inclination angle of the sixth region.

13 Claims, 14 Drawing Sheets

(58) Field of Classification Search
CPC .... B23B 2200/3654; B23B 2200/3672; B23B 2200/3645; B23B 2200/286; B23B 2200/201; B23C 2200/366; B23C 2200/365

See application file for complete search history.

(56) References Cited

U.S. PATENT DOCUMENTS

| | | | | |
|---|---|---|---|---|
| 4,318,645 | A * | 3/1982 | McCreery | B23B 27/143 407/114 |
| 4,340,324 | A * | 7/1982 | McCreery | B23B 27/145 407/114 |
| 4,710,069 | A * | 12/1987 | Loqvist | B23B 27/143 407/114 |
| 5,116,167 | A * | 5/1992 | Niebauer | B23B 27/143 407/114 |
| 5,222,843 | A * | 6/1993 | Katbi | B23B 27/143 407/114 |
| 5,230,591 | A * | 7/1993 | Katbi | B23B 27/143 407/114 |
| 5,660,507 | A * | 8/1997 | Paya | B23B 27/045 407/114 |
| 5,915,889 | A * | 6/1999 | Kress | B23B 27/141 407/114 |
| 6,786,682 | B1 * | 9/2004 | Wiman | B23B 27/143 407/114 |
| 9,630,256 | B2 * | 4/2017 | Nada | B23B 27/141 |
| 10,040,125 | B2 * | 8/2018 | Matsuda | B23B 27/143 |
| 2011/0070040 | A1 * | 3/2011 | Park | B23B 27/143 407/113 |
| 2012/0170987 | A1 * | 7/2012 | Komatsuka | B23B 27/141 407/114 |
| 2013/0064613 | A1 * | 3/2013 | Krishtul | B23B 27/143 407/114 |
| 2015/0078844 | A1 * | 3/2015 | Majima | B23B 27/1607 407/114 |
| 2015/0283617 | A1 * | 10/2015 | Nagarajan | B23B 27/143 407/114 |
| 2017/0297116 | A1 | 10/2017 | Sakai | |
| 2017/0320143 | A1 * | 11/2017 | Lof | B23B 27/145 |

FOREIGN PATENT DOCUMENTS

| | | | |
|---|---|---|---|
| JP | 2002210604 A | 7/2002 | |
| JP | 2002254214 A | 9/2002 | |
| WO | WO-2012023325 A1 * | 2/2012 | ........... B23B 27/145 |
| WO | WO-2016017470 A1 * | 2/2016 | ............ B23B 27/14 |
| WO | 2016043029 A1 | 3/2016 | |
| WO | WO-2020031871 A1 * | 2/2020 | ............ B23B 27/14 |

* cited by examiner

CUTTING INSERT, CUTTING TOOL, AND METHOD OF MANUFACTURING MACHINED PRODUCT

CROSS-REFERENCE TO RELATED APPLICATIONS

This application is a national stage entry according to 35 U.S.C. 371 of PCT Application No. PCT/JP2017/027071 filed on Jul. 26, 2017, which claims priority to Japanese Application No. 2016-144825 filed on Jul. 28, 2016, which are entirely incorporated herein by reference.

TECHNICAL FIELD

The present disclosure relates to a cutting insert, a cutting tool, and a method of manufacturing a machined product.

BACKGROUND

Indexable cutting tools with a cutting insert attached to a holder may be used as a cutting tool used in a cutting process or the like. The cutting insert used for the cutting tool may include a polygonal-shaped upper surface, a side surface, and a cutting edge located at an intersecting part of the upper surface and the side surface. The above cutting tool may be capable of cutting out a workpiece by bringing the cutting edge into contact with the workpiece.

Patent Document 1 (Japanese Unexamined Patent Publication No. 2002-210604) discusses a cutting insert used for the above cutting tool. The cutting insert described in Patent Document 1 may include a land part formed along the cutting edge on the upper surface. The land part may include a narrow-width portion which is located at a corner radius portion of a nose part and has a small width.

The cutting insert discussed in Patent Document 1 may be capable of enhancing chip discharge performance. However, the cutting edge may be fractured at the narrow width portion when used in, for example, a high feed machining under large cutting loads.

SUMMARY

A cutting insert in a non-limiting aspect of the present disclosure may include an upper surface, a lower surface, a side surface, and a cutting edge. The upper surface may include a first side part, a second side part, and a corner part located between the first side part and the second side part. The lower surface may be located at an opposite side of the upper surface. The side surface may be located between the upper surface and the lower surface. The cutting edge may be located at an intersecting part of the upper surface and the side surface. The upper surface may further include a first surface along the cutting edge, and a second surface which is located further inward than the first surface and inclined toward the lower surface as going farther from the first surface. The cutting edge may include a first cutting edge located at the corner part, and a second cutting edge located at the first side part. The first surface may include a first region along the first cutting edge, a second region adjacent to the first region, and a third region which is adjacent to the second region and along the second cutting edge. The second surface may include a fourth region corresponding to the first region, a fifth region corresponding to the second region, and a sixth region corresponding to the third region. A width W72 of the second region in a direction perpendicular to the cutting edge may be smaller than each of a width W71 of the first region in the direction perpendicular to the cutting edge and a width W73 of the third region in the direction perpendicular to the cutting edge. An inclination angle θ92 of the fifth region may be smaller than each of an inclination angle θ91 of the fourth region and an inclination angle θ93 of the sixth region.

A cutting tool in a non-limiting aspect of the present disclosure may include a cutting insert as described above, and a holder designed to attach the cutting insert to the holder.

A method of manufacturing a machined product in a non-limiting aspect of the present disclosure may include rotating a workpiece, bringing a cutting tool as described above into contact with the workpiece being rotated, and moving the cutting tool away from the workpiece.

DETAILED DESCRIPTION

<Cutting Insert>

Figure 1:
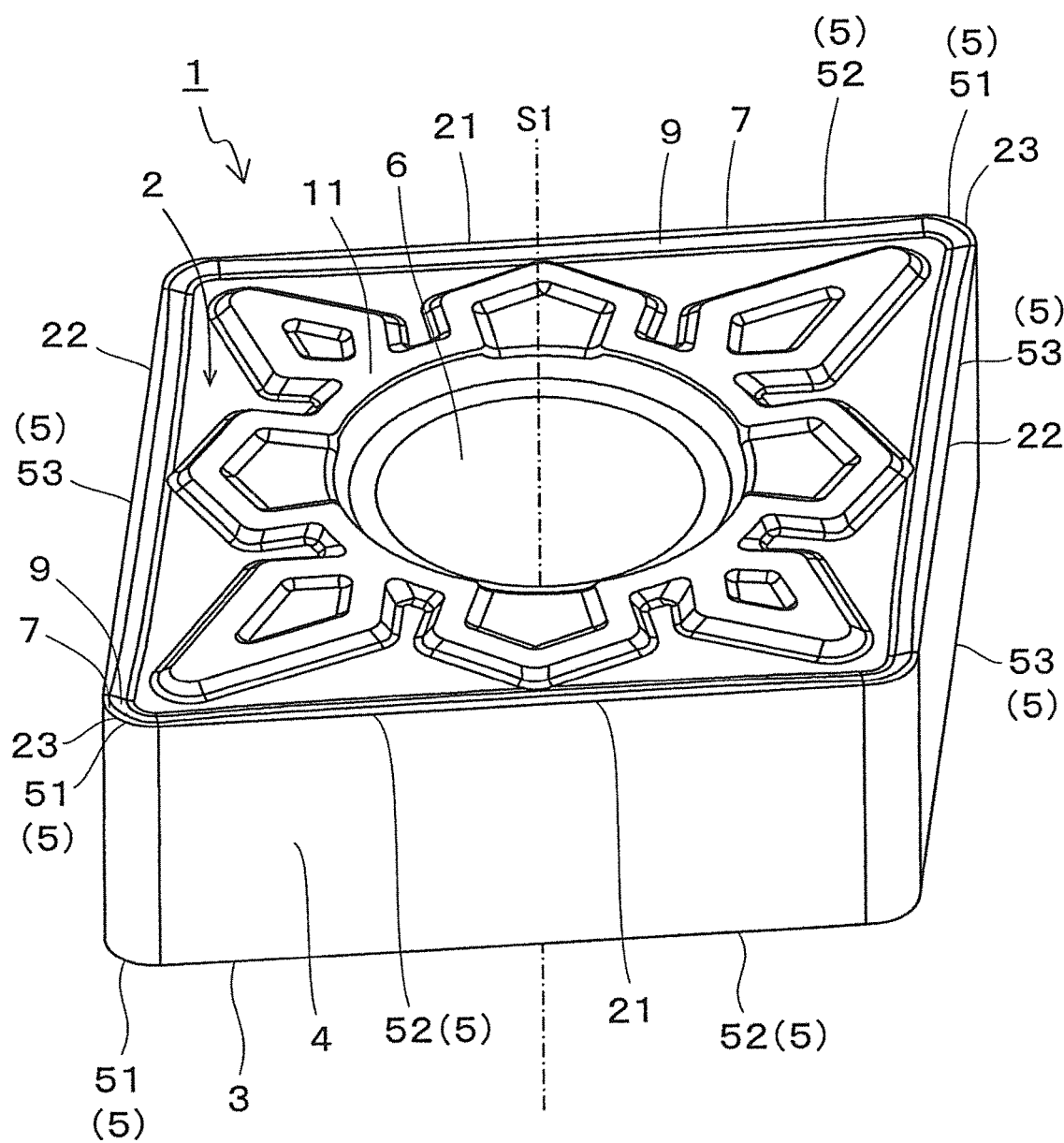
FIG. 1 is a perspective view illustrating a cutting insert in a non-limiting aspect of the present disclosure.

The cutting insert in a non-limiting aspect of the present disclosure is described in detail below with reference to the drawings. For the sake of description, the drawings referred to in the following illustrate, in a simplified form, only main members necessary for describing various non-limiting aspects of the present disclosure. The cutting insert in a non-limiting aspect of the present disclosure is therefore capable of including any arbitrary structural member not illustrated in the drawings referred to. Sizes of the members in each of the drawings do not faithfully represent sizes of actual structural members and ratios of these members. These points are also true for a cutting tool and a method of manufacturing a machined product described later.

Figure 2:
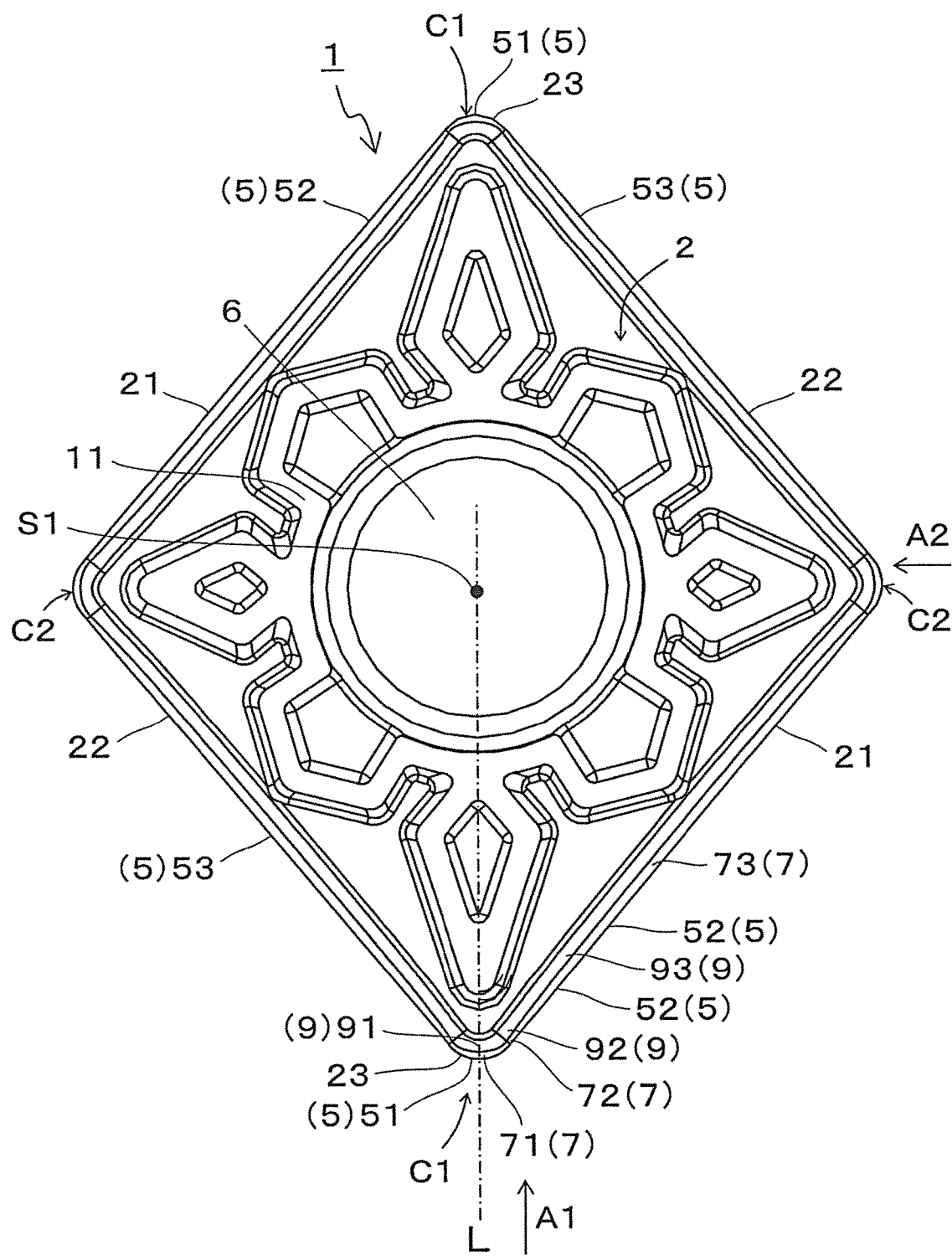
FIG. 2 is a top view of the cutting insert illustrated in FIG. 1.

The cutting insert 1 (hereinafter also referred to as "insert 1") in a non-limiting aspect of the present disclosure includes an upper surface 2, a lower surface 3, a side surface 4, and a cutting edge 5 as illustrated in FIGS. 1 to 4. The lower surface 3 is located at the opposite side of the upper surface 2. The side surface 4 is located between the upper surface 2 and the lower surface 3. The cutting edge 5 is located at an intersecting part of the upper surface 2 and the side surface 4. The upper surface 2 includes a first surface 7 and a second surface 9. The cutting edge 5 also includes a first cutting edge 51 and a second cutting edge 52. The insert 1 also includes a through hole 6 as illustrated in FIGS. 1 and 2. The upper surface 2 and the lower surface 3 are called for convenience sake and do not indicate up and down directions. For example, the upper surface 2 may not be a surface directed upward when the insert 1 is attached to a holder 103 described later.

As illustrated in FIG. 2, the upper surface 2 has an approximately quadrangular shape, more specifically an approximately rhombus shape when viewed from above (in a top view). That is, the upper surface 2 of the insert 1 has the approximately rhombus shape including two acute angle corners C1 and two obtuse angle corners C2, and has rotational symmetry of 180 degrees relative to a central axis S1 of the insert 1 described later in a top view. The upper surface 2 includes a first side part 21, a second side part 22, and a corner part 23 located between the first side part 21 and the second side part 22. The corner part 23 is located at the acute angle corners C1.

The term "top view" denotes a state in which the insert 1 is viewed from a side of the upper surface 2 unless otherwise noted. The shape of the insert 1 is not limited to the approximately quadrangular shape, but may be a plate shape having an approximately polygonal shape, such as a triangular or pentagonal shape.

A side of the approximately rhombus shape of the insert 1 in a top view is settable to, for example, 6-25 mm. A distance between the upper surface 2 and the lower surface 3 in the insert 1, namely, a thickness of the insert 1 is settable to, for example, 1-10 mm. The term "thickness" denotes a line segment parallel to the central axis S1 of the insert 1 in a distance between a part of the upper surface 2 which is located uppermost and a part of the lower surface 3 which is located lowermost. The term "side view" denotes a state in which the insert 1 is viewed from a side of the side surface 4 unless otherwise noted in the following. The term "up and down directions" denotes a direction along the central axis S1 of the insert 1. When a direction from the inside of the insert 1 toward the upper surface 2 is positive, a direction from the inside of the insert 1 toward the lower surface 3 is negative, a positive side in a direction along the central axis S1 is upside, and a negative side in a direction along the central axis S1 is downside. The term "the central axis S1 of the insert 1" denotes an axis which extends between the upper surface 2 and the lower surface 3, and which serves as a rotation axis when the insert 1 is rotated in a top view.

Figure 3:
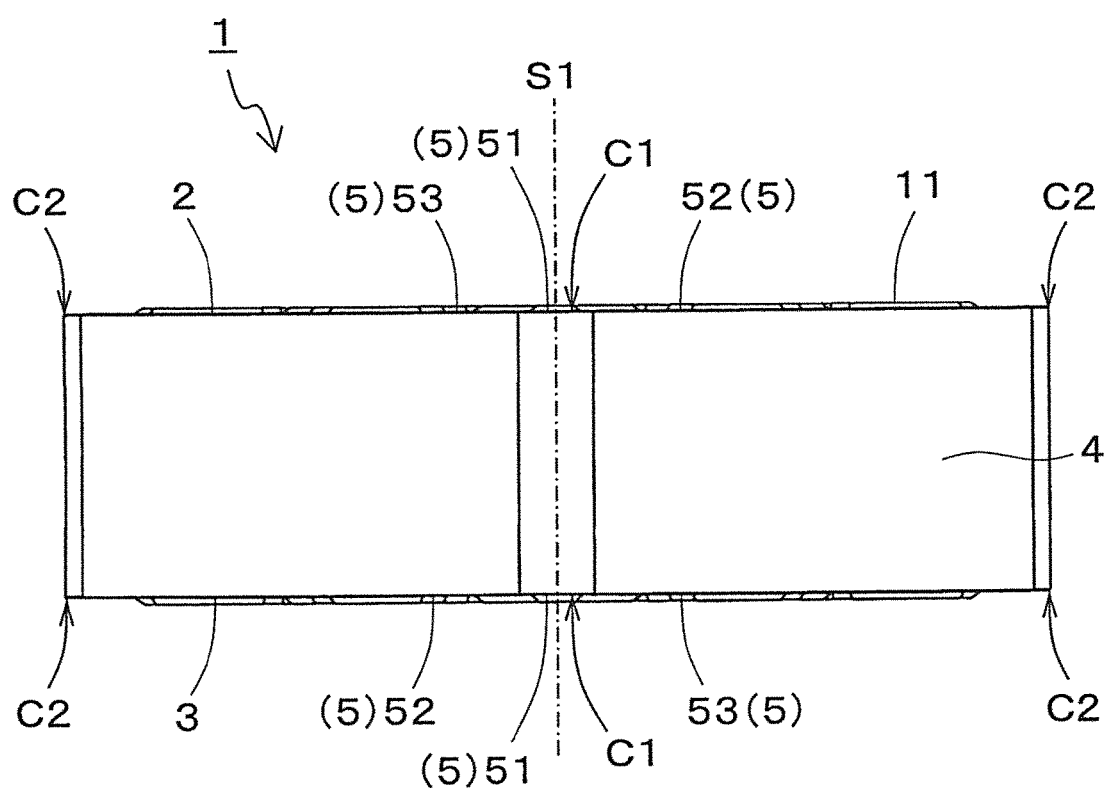
FIG. 3 is a side view of the cutting insert illustrated in FIG. 2, taken from the direction A1.
Figure 4:
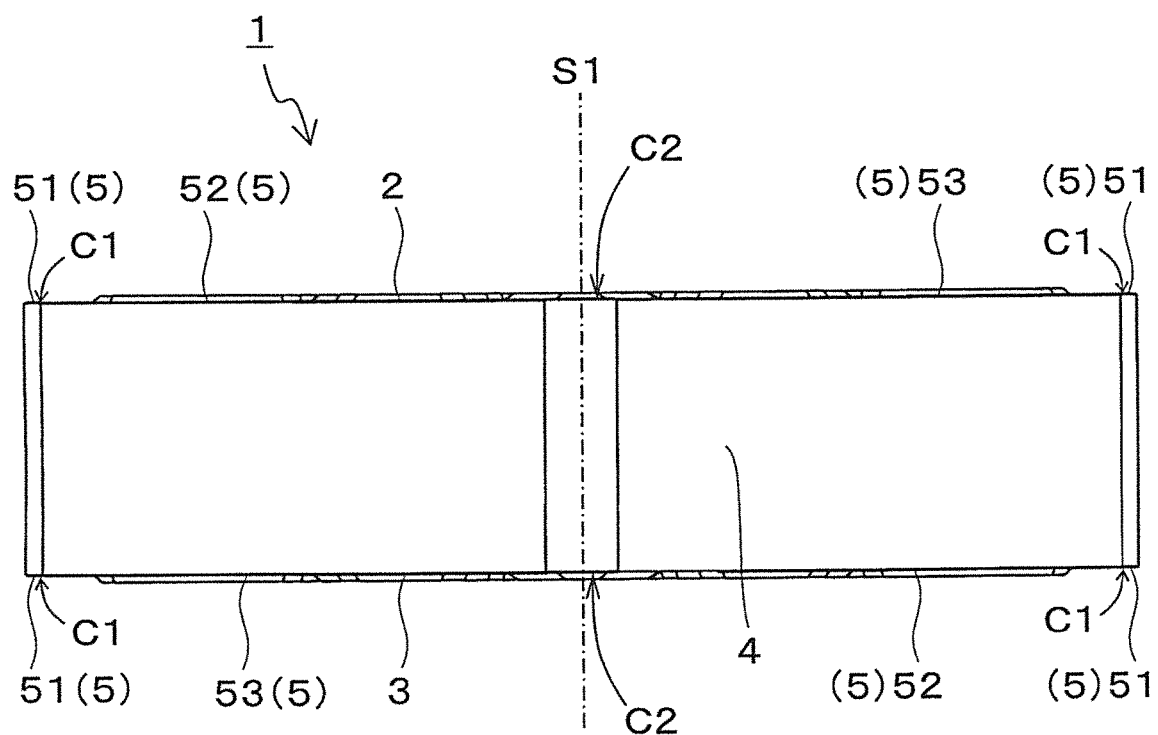
FIG. 4 is a side view of the cutting insert illustrated in FIG. 2, taken from the direction A2.

Like the side of the upper surface 2, the insert 1 also includes the cutting edge 5 along an intersecting part of the lower surface 3 and the side surface 4 as illustrated in FIGS. 1, 3, and 4. The insert 1 of a non-limiting aspect of the present disclosure is a so-called negative-type insert. When a cutting process is carried out using the cutting edge 5 on a side of the lower surface 3, the upper surface 2 is usable as a seating surface with respect to the holder 103 described later. Each of the side of the upper surface 2 and the side of the lower surface 3 is usable for the cutting process in the insert 1 in a non-limiting aspect of the present disclosure. Therefore, the configuration on the side of the lower surface 3 has a shape obtained by inverting the configuration of the side of the upper surface 2. In other words, the insert 1 has rotational symmetry around a line perpendicular to a paper plane of FIG. 3. Hence, with the insert 1 in a non-limiting aspect of the present disclosure, the cutting process can be carried out using a total of four portions, two portions on the upper surface 2 and two portions on the lower surface 3. Alternatively, the insert 1 may be a so-called positive-type insert in which the cutting edge 5 is formed only on the side of the upper surface 2.

Individual components of the insert 1 of a non-limiting aspect of the present disclosure are sequentially described in detail below.

(Side Surface 4)

The side surface 4 is located between the upper surface 2 and the lower surface 3, and connects to each of the upper surface 2 and the lower surface 3 as illustrated in FIGS. 1, 3, and 4. At least a part of the side surface 4 functions as a restraining surface when the insert 1 is attached to the holder 103, and also functions as a so-called flank surface for avoiding contact with a workpiece during a cutting process. The side surface 4 is disposed perpendicular to the upper surface 2 and the lower surface 3 in a non-limiting aspect of the present disclosure. Thus, the upper surface 2 has approximately the same shape as the lower surface 3 so as to be overlapped with each other in a top view.

(Cutting Edge 5)

The cutting edge 5 is located at an intersecting part of the upper surface 2 and the side surface 4, and includes a first cutting edge 51 and a second cutting edge 52. The cutting edge 5 is used for cutting out the workpiece during the cutting process. So-called honing process may be applied to a region where the upper surface 2 intersects with the side surface 4, and where the cutting edge 5 is located. Because of the honing process applied thereto, the strength of the cutting edge 5 is less likely to become low. Examples of the honing process include round honing.

The first cutting edge 51 is the cutting edge located at the corner part 23 of the upper surface 2, and is a so-called corner cutting edge. That is, the first cutting edge 51 functions to reduce fracture of the cutting edge 5. As illustrated in FIG. 2, the first cutting edge 51 has a curvilinear shape in a top view in a non-limiting aspect of the present disclosure. As illustrated in FIG. 3, the first cutting edge 51 has a straight line shape in a side view. Specifically, a height of the first cutting edge 51 relative to the lower surface 3 is constant. This configuration contributes to ensuring cutting edge strength, thereby enhancing tool life even during a cutting process of a workpiece, such as cast iron. Alternatively, the first cutting edge 51 may be inclined in a side view. For example, the first cutting edge 51 may be inclined toward the lower surface 3 as going farther from a bisector L of the corner part 23 illustrated in FIG. 2.

The second cutting edge 52 is the cutting edge located at the first side part 21 of the upper surface 2, and is a so-called main cutting edge. That is, the second cutting edge 52 mainly functions to generate chips through cutting action. In a non-limiting aspect of the present disclosure, as illustrated in FIG. 2, the second cutting edge 52 has a straight line shape in a top view. As illustrated in FIG. 3, the second cutting edge 52 has a straight line shape in a side view. Specifically, a height of the second cutting edge 52 relative to the lower surface 3 is constant. This configuration contributes to ensuring cutting edge strength, thereby enhancing tool life even during the cutting process of a workpiece, such as cast iron. Like the first cutting edge 51, the second cutting edge 52 may be inclined in a side view. For example, the second cutting edge 52 may be inclined toward the lower surface 3 as going farther from the corner part 23 in a side view.

The phrase that "the height of each of the cutting edges is constant" denotes that the height of each of the cutting edges relative to the lower surface 3 may not be strictly constant over the entire length of each of the cutting edges. The phrase that "the height of each of the cutting edges is constant" denotes that the height of each of the cutting edges is substantially constant. Although depending on the size of the insert 1, the heights may have a difference of ±0.05 mm. The height of the first cutting edge 51 relative to the lower surface 3 is, for example, 3-8 mm, and the height of the second cutting edge 52 relative to the lower surface 3 is, for example, 3-8 mm.

As described above, the insert 1 is capable of performing the cutting process by using a total of four corners, two portions on the upper surface 2 and two portions on the lower surface 3. The cutting edge 5 therefore includes two first cutting edges 51 and two second cutting edges 52 on each of a side of the upper surface 2 and a side of the lower surface 3.

In a non-limiting aspect of the present disclosure, the cutting edge 5 also includes not only the second cutting edge 52 located at the first side part 21, which is one of the first side part 21 and the second side part 22 each constituting the acute angle corner C1, but also a third cutting edge 53 located at the second side part 22, on a side of the upper surface 2 and a side of the lower surface 3 in a non-limiting aspect of the present disclosure. Specifically, the cutting edge 5 further includes two third cutting edges 53 on each of the side of the upper surface 2 and the side of the lower surface 3. The third cutting edges 53 have the same configuration as the second cutting edge 52 described above. This makes it possible for the insert 1 to perform a cutting process using the acute angle corner C1 even in a cutting process of right-hand and left-hand. That is, the first cutting edge 51 and the second cutting edge 52 are used for the cutting process of right-hand, and the first cutting edge 51 and the third cutting edge 53 are used for the cutting process of left-hand. In a non-limiting aspect of the present disclosure, as illustrated in FIG. 2, the second cutting edge 52 and the third cutting edge 53 are arranged in line symmetry with respect to the bisector L of the corner part 23 located at the acute angle corner C1.

As illustrated in FIG. 3, the first cutting edge 51 and the second cutting edge 52 may be located on a straight line in a side view in a non-limiting aspect of the present disclosure. Specifically, a height of the first cutting edge 51 relative to the lower surface 3 may be equal to a height of the second cutting edge 52 relative to the lower surface 3. When satisfying this configuration, a cutting edge height of each of the first cutting edge 51 and the second cutting edge 52 remain unchanged, thus leading to a stable cutting process over the entire lengths of the first cutting edge 51 and the second cutting edge 52. For a similar reason, the first cutting edge 51 and the third cutting edge 53 may also be located on a straight line in a side view. Specifically, the height of the first cutting edge 51 relative to the lower surface 3 may be equal to the height of the third cutting edge 53 relative to the lower surface 3. Alternatively, the first cutting edge 51, the second cutting edge 52, and the third cutting edge 53 may be located on a single straight line in a side view. That is, the first cutting edge 51, the second cutting edge 52, and the third cutting edge 53 may be identical in height relative to the lower surface 3.

Although the cutting edge 5 includes the two first cutting edges 51, the two second cutting edges 52, and the two third cutting edges 53 on the side of the upper surface 2 and the side of the lower surface 3 in a non-limiting aspect of the present disclosure, the configuration of the cutting edge 5 in the insert 1 is not limited to this configuration. That is, the cutting edge 5 would include at least one first cutting edge 51 and at least one second cutting edge 52.

(Through Hole 6)

The through hole 6 is a hole for inserting a fastening screw or an attachment bolt when the insert 1 is attached to the holder 103. The insert 1 is fixed to the holder 103 through a clamp member 107 as described later with reference to FIG. 11 in a non-limiting aspect of the present disclosure. Therefore, a tip of the clamp member 107 for clamp fixing is inserted into the through hole 6. Subsequently, a screw 105 for fixing the clamp member 107 is screwed into the holder 103. Thereby, the tip of the clamp member 107 presses the insert 1 against the holder 103, so that the insert 1 is fixed to the holder 103. As a method of fixing the insert 1 to the holder 103, other methods, such as screw fixation, may be employed instead of the above method using a clamp structure.

As illustrated in FIG. 2, the through hole 6 is located at a middle part of the upper surface 2 in a non-limiting aspect of the present disclosure. More specifically, the through hole 6 passes through the insert 1 from a center of the upper surface 2 to a center of the lower surface 3. A central axis of the through hole 6 coincides with an imaginary straight line connecting the center of the upper surface 2 and the center of the lower surface 3. A central axis of the through hole 6 may be replaced with the central axis S1 of the insert 1.

(Upper Surface 2)

The upper surface 2 includes the first surface 7 and the second surface 9 as described above. The upper surface 2 also includes a third surface 11, at least part of which is located above the cutting edge 5 in a side view, at a portion of the upper surface 2 which is located around the through hole 6 and located away from the cutting edge 5. As illustrated in FIG. 3, the third surface 11 is a flat surface in a side view, and functions as a seating surface upon attachment to the holder 103.

The first surface 7 is first described. As illustrated in FIG. 2, the first surface 7 is a portion of the upper surface 2 which is located along the cutting edge 5, and is a surface functioning as a so-called land surface. The first surface 7 may include a flat surface-shaped portion or a curved surface-shaped portion. The term "flat surface-shape" is a concept that includes not only a strictly defined flat surface but also ones which include slight irregularities or curve in so far as they fulfil their function. This is also true for the term "curved surface shape." The first surface 7 has the flat surface shape in a non-limiting aspect of the present disclosure.

As illustrated in FIGS. 5 to 10, the first surface 7 includes a first region 71, a second region 72, and a third region 73. The first region 71 is a region of the first surface 7 which is along the first cutting edge 51. The third region 73 is a region of the first surface 7 which is along the second cutting edge 52. The second region 72 is a region of the first surface 7 which is located between the first region 71 and the third region 73.

Figure 6:
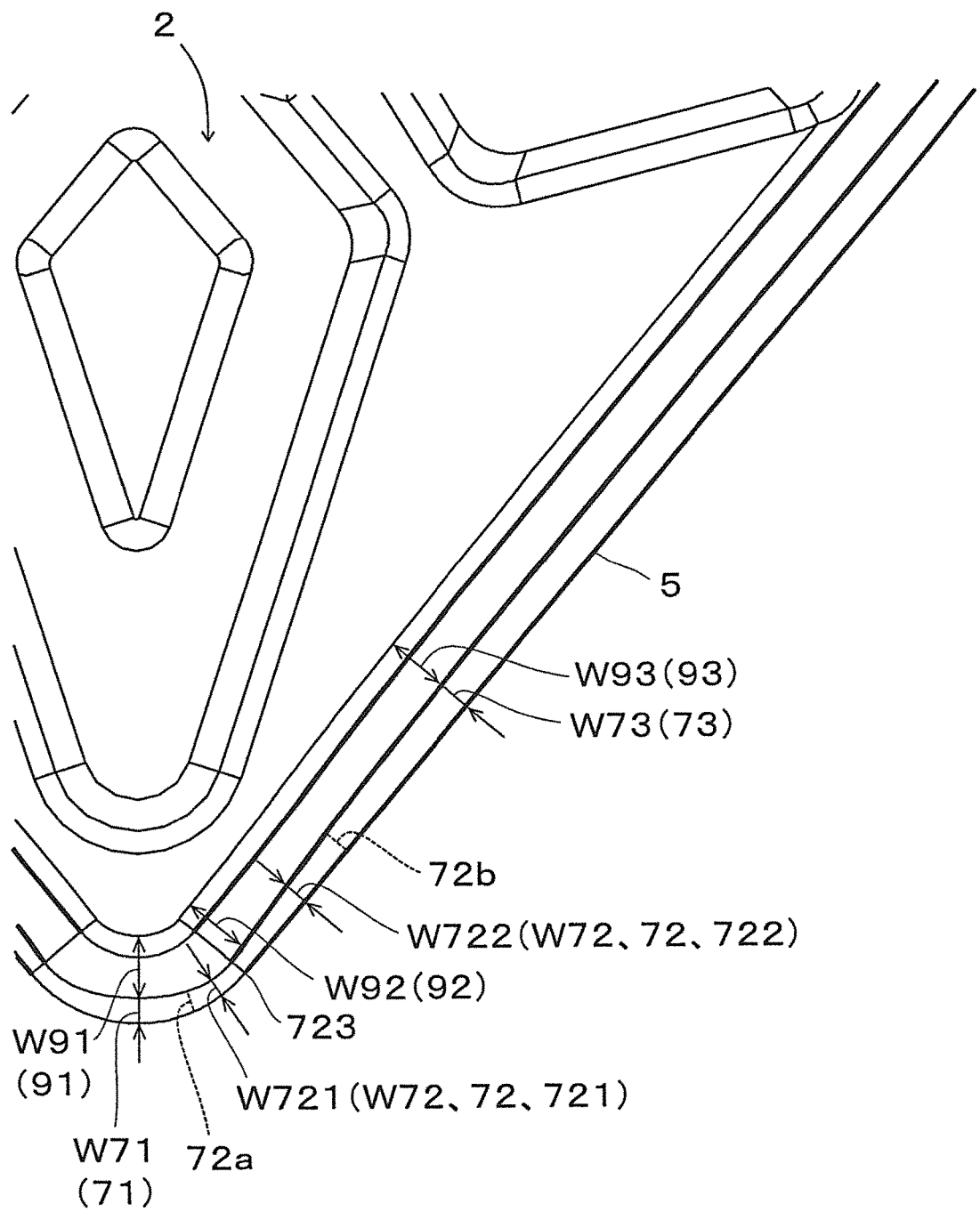
FIG. 6 is a partially enlarged view of FIG. 2.
Figure 7:
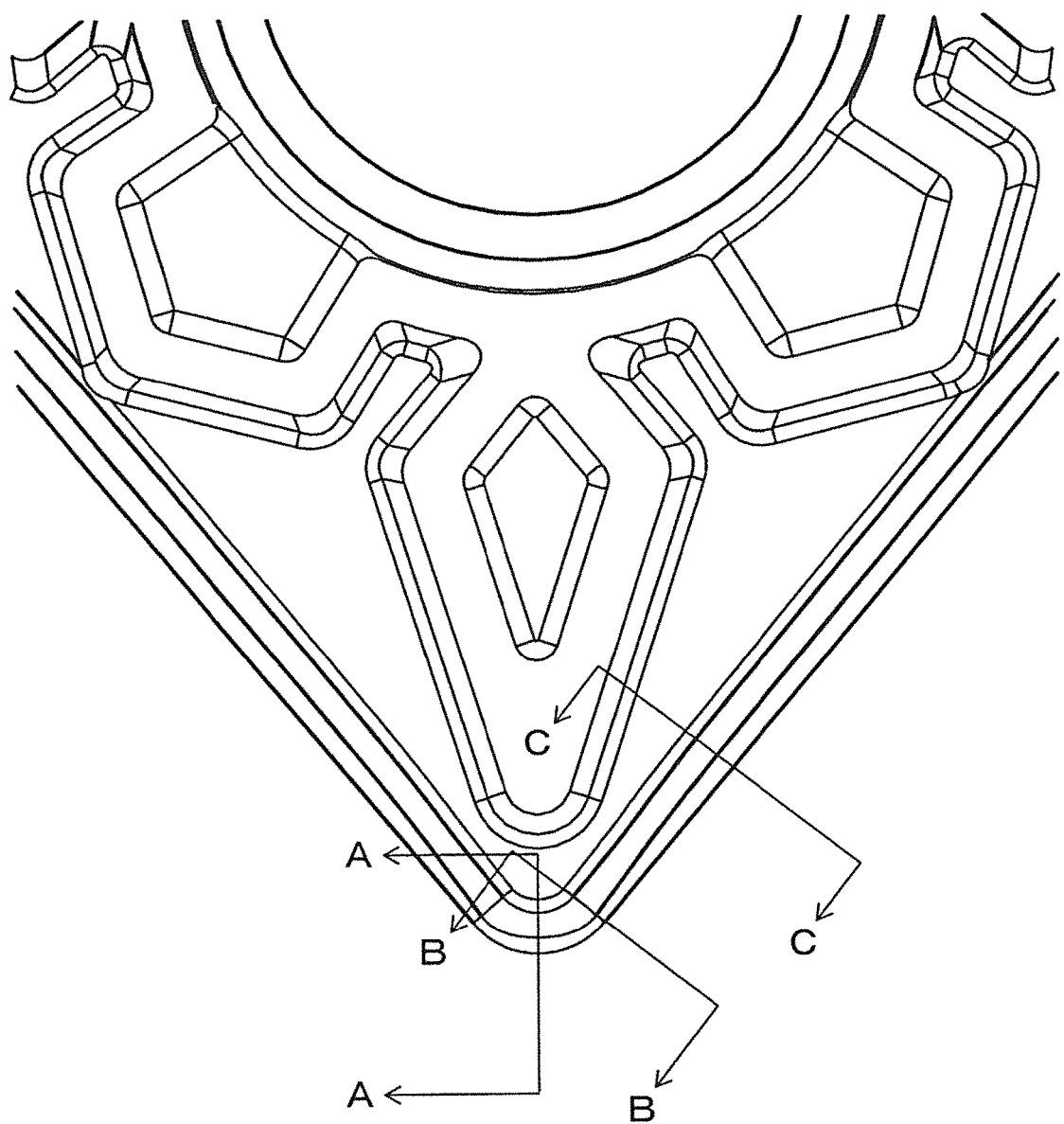
FIG. 7 is a diagram illustrating sectional positions respectively for cross-sectional positions in FIGS. 8 to 10 in the partially enlarged view of FIG. 2.

As illustrated in FIG. 6, a first end 72a that is one end of the second region 72 is adjacent to the first region 71. A second end 72b that is the other end of the second region 72 is adjacent to the third region 73. The second region 72 connects to the first region 71 at the first end 72a, and also connects to the third region 73 at the second end 72b in a non-limiting aspect of the present disclosure. A different region may be located between the first region 71 and the second region 72, and between the second region 72 and the third region 73 in so far as these regions 71, 72, and 73 fulfil their function.

The second surface 9 is then described. The second surface 9 is a portion of the upper surface 2 which is located further inward than the first surface 7. The term "inward" denotes inward of the insert 1 with respect to the cutting edge 5, namely, a side of the through hole 6 (a side of the central axis S1). The second surface 9 is inclined toward the lower surface 3 as going farther from the first surface 7, and functions as a so-called rake surface. Specifically, the second surface 9 functions to smoothly discharge chips generated by the cutting edge 5 during a cutting process to the outside by causing the chips to be deformed or by causing a change in flow direction of the chips upon contact with the chips. Like the first surface 7, the second surface 9 may include a flat surface-shaped portion or a curved surface-shaped portion. The second surface 9 has a flat surface shape in a non-limiting aspect of the present disclosure.

Figure 8:
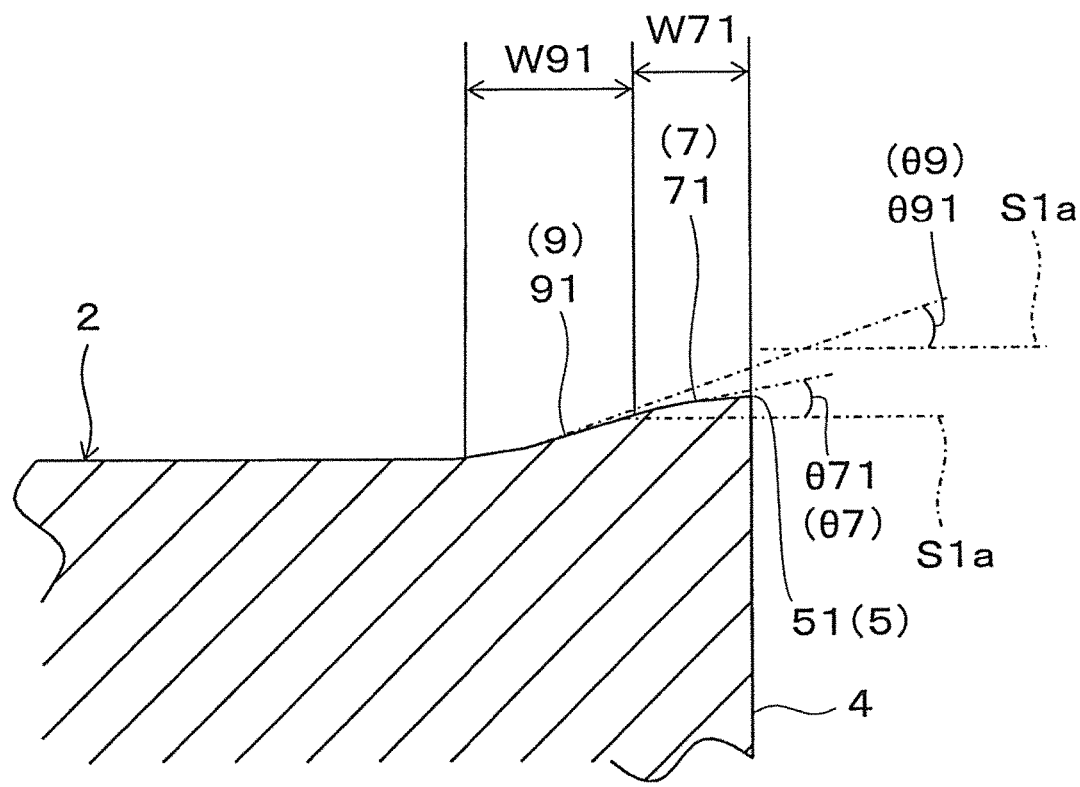
FIG. 8 is an enlarged view of a main part in a cross section taken along line A-A in FIG. 7.
Figure 9:
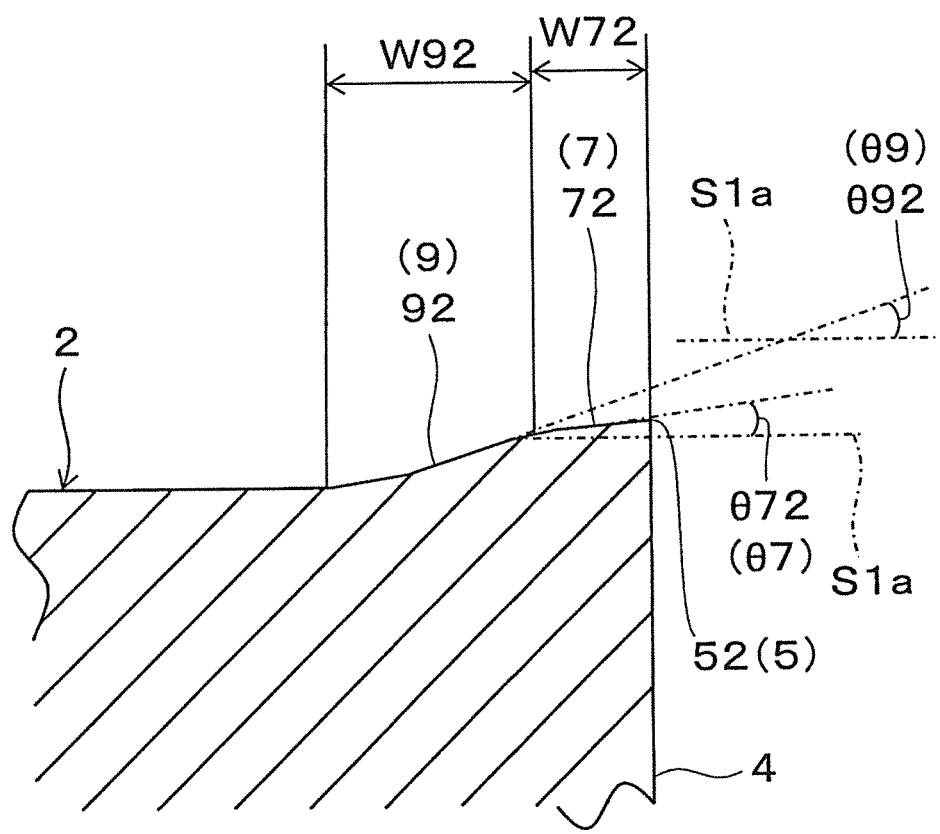
FIG. 9 is an enlarged view of a main part in a cross section taken along line B-B in FIG. 7.
Figure 10:
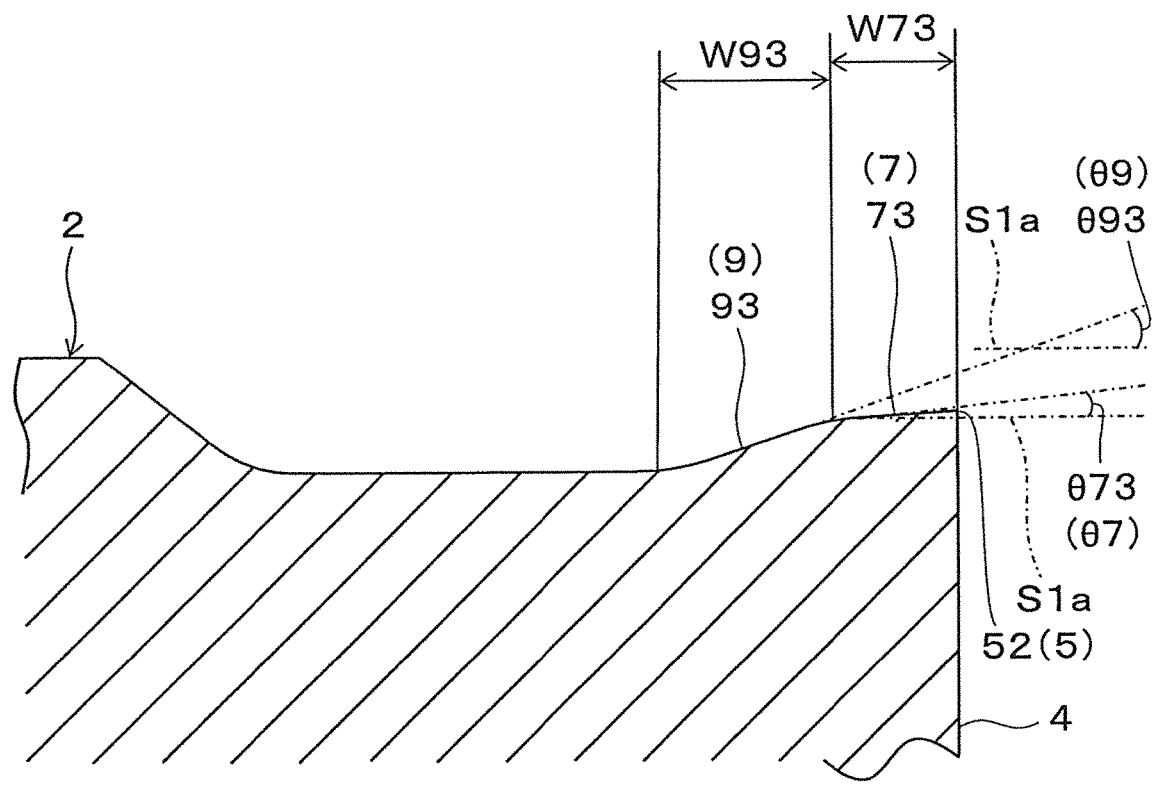
FIG. 10 is an enlarged view of a main part in a cross section taken along line C-C in FIG. 7.

As illustrated in FIGS. 5 to 10, the second surface 9 includes a fourth region 91, a fifth region 92, and a sixth region 93. The fourth region 91 is a region of the second surface 9 which corresponds to the first region 71. The fifth region 92 is a region of the second surface 9 which corresponds to the second region 72. The sixth region 93 is a region of the second surface 9 which corresponds to the third region 73. Specifically, as illustrated in FIG. 8, the fourth region 91 is located inward of the first region 71 and inclined toward the lower surface 3 as going farther from the first region 71. As illustrated in FIG. 9, the fifth region 92 is located inward of the second region 72 and inclined toward the lower surface 3 as going farther from the second region 72. As illustrated in FIG. 10, the sixth region 93 is located inward of the third region 73 and inclined toward the lower surface 3 as going farther from the third region 73.

As illustrated in FIG. 6 and FIGS. 8 to 10, a width W72 of the second region 72 in a direction perpendicular to the cutting edge 5 is smaller than each of a width W71 of the first region 71 in the direction perpendicular to the cutting edge 5 and a width W73 of the third region 73 in the direction perpendicular to the cutting edge 5, on the first surface 7 in a non-limiting aspect of the present disclosure. Additionally, an inclination angle θ92 of the fifth region 92 is smaller than each of an inclination angle θ91 of the fourth region 91 and an inclination angle θ93 of the sixth region 93. With this configuration, a width of the land surface (first surface 7) is reducible and a rake angle (the inclination angle θ9 of the second surface 9) is reducible on a cutting edge portion of the cutting edge 5 which is the first to come into contact with a workpiece during a cutting process. This makes it possible to reduce cutting resistance and ensure cutting edge strength. Consequently, the cutting edge 5 is less likely to be fractured even under cutting conditions for high feed machining under large cutting loads.

As illustrated in FIG. 6, the width W71, the width W72, and the width W73 are respectively lengths of their corresponding regions 71, 72, and 73 in the direction perpendicular to the cutting edge 5 in a top view. In other words, as illustrated in FIGS. 8 to 10, the width W71, the width W72, and the width W73 are respectively lengths of their corresponding regions 71, 72, and 73 in a direction along a reference plane S1a perpendicular to the central axis S1 of the insert 1. The width W71 is, for example, 0.15-0.2 mm. The width W72 is, for example, 0.1-0.15 mm. The width W73 is, for example, 0.18-0.23 mm.

The inclination angle θ91, the inclination angle θ92, and the inclination angle θ93 are respectively inclination angles of their corresponding regions 91, 92, and 93 relative to the reference plane S1a perpendicular to the central axis S1 extending between the upper surface 2 and the lower surface 3. That is, as illustrated in FIGS. 8 to 10, the inclination angle θ91, the inclination angle θ92, and the inclination angle θ93 are respectively angles formed by the reference plane S1a perpendicular to the central axis S1 extending between the upper surface 2 and the lower surface 3, and their corresponding regions 91, 92, and 93. The inclination angle θ91 is, for example, 16-20 degrees. The inclination angle θ92 is, for example, 13-16 degrees. The inclination angle θ93 is, for example, 16-20 degrees.

Figure 5:
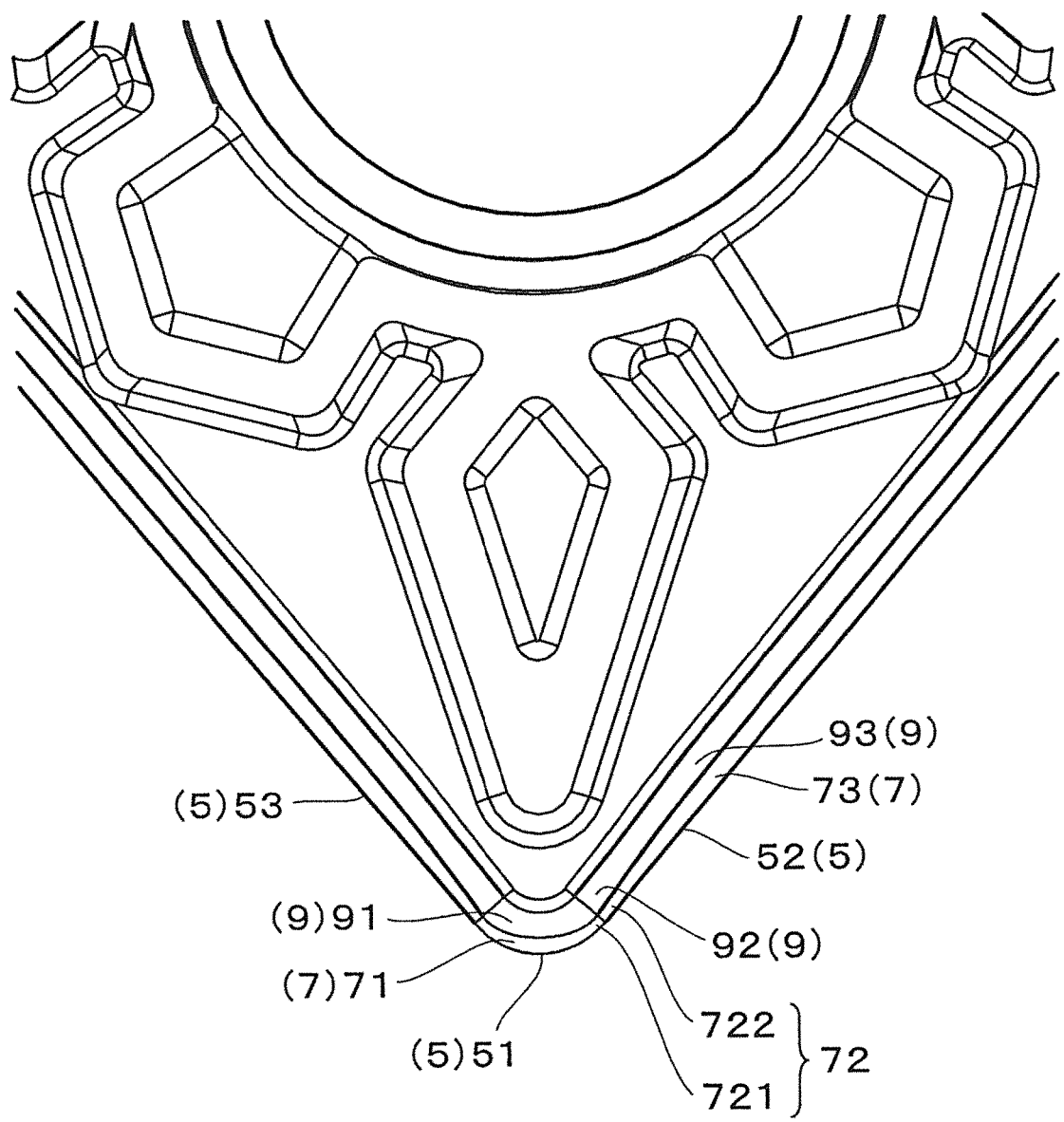
FIG. 5 is a partially enlarged view of FIG. 2.

As illustrated in FIGS. 5 and 6, the second region 72 may include a first portion 721 and a second portion 722 in a non-limiting aspect of the present disclosure. The first portion 721 is adjacent to the first region 71 and along the first cutting edge 51. The second portion 722 is adjacent to the third region 73 and along the second cutting edge 52. That is, the second region 72 extends over both of a region of the first surface 7 which is along the first cutting edge 51, and a region of the first surface 7 which is along the second cutting edge 52. When satisfying this configuration, a connection portion of the first cutting edge 51 and the second cutting edge 52 has a smooth shape change in the connection portion, and stress is less likely to concentrate in the connection portion.

As illustrated in FIG. 6, a width W721 of the first portion 721 in the direction perpendicular to the cutting edge 5 may decrease as going farther from the first region 71. A width W722 of the second portion 722 in the direction perpendicular to the cutting edge 5 may decrease as going farther from the third region 73. When satisfying this configuration, a cutting resistance is suitably reducible.

A decrement of the width W721 of the first portion 721 may be higher than a decrement of the width W722 of the second portion 722 in a non-limiting aspect of the present disclosure. When satisfying this configuration, fracture resistance of the cutting edge 5 can be improved on a side of the third region 73 while reducing a cutting resistance on a side of the first region 71. The decrement of the width W721 is, for example, 0.03-0.05 mm. The decrement of the width W722 is, for example, 0.05-0.08 mm.

Here, the width W721 of the first portion 721 and the width W722 of the second portion 722 can be defined in the same manner as the widths W71, W72, and W73 described above. The phrase that "the width W721 decreases" denotes that, besides cases where the width W721 decreases over the entire length of the first portion 721, the first portion 721 may include a portion in which the width W721 remains unchanged. Alternatively, the width W721 may decrease stepwise. The decrease in the width W722 can also be defined in the same manner as the width W721. When the widths44 W721 and W722 decrease gradually at a fixed rate, both of the reduction in cutting resistance and the fracture resistance of the cutting edge 5 are attainable in a well-balanced manner.

The first portion 721 may connect to the second portion 722 in a non-limiting aspect of the present disclosure. When satisfying this configuration, the effect of reducing cutting resistance is well compatible with the effect of improving the fracture resistance of the cutting edge 5. Alternatively, a different portion may be located between the first portion 721 and the second portion 722 in so far as the portions 721 and 722 fulfil their function.

As illustrated in FIGS. 6, 8, and 10, the width W73 of the third region 73 in the direction perpendicular to the cutting edge 5 may be greater than the width W71 of the first region 71 in the direction perpendicular to the cutting edge 5 in a non-limiting aspect of the present disclosure. When satisfying this configuration, the cutting edge 5 is less likely to be fractured in the third region 73 that may be subjected to a sudden increase in cutting depth.

As illustrated in FIGS. 8 and 10, the inclination angle θ93 of the sixth region 93 may be equal to the inclination angle θ91 of the fourth region 91 in a non-limiting aspect of the present disclosure. When satisfying this configuration, the cutting resistance is suitably reducible. The phrase that "the inclination angle θ91 is equal to the inclination angle θ93" denotes that both are substantially equal to each other and, for example, both may include a difference of ±1 degree.

Alternatively, the first surface 7 may be inclined toward the lower surface 3 as going farther from the cutting edge 5 in a non-limiting aspect of the present disclosure. That is, the first surface 7 may be a so-called positive land surface. When satisfying this configuration, the cutting edge strength can be ensured, and the cutting edge 5 is therefore less likely to be fractured.

As illustrated in FIGS. 8 to 10, the inclination angle θ7 of the first surface 7 may be smaller than the inclination angle θ9 of the second surface 9 in a non-limiting aspect of the present disclosure. When satisfying this configuration, the effect of reducing the fracture of the cutting edge 5 can be enhanced. The inclination angles θ7 and θ9 can be defined in the same manner as the inclination angles θ91, θ92, and θ93. The inclination angle θ7 is, for example, 2-6 degrees. The inclination angle θ9 is, for example, 13-20 degrees.

The inclination angle θ72 of the second region 72 of the first surface 7 may be smaller than the inclination angle θ71 of the first region 71 of the first surface 7 and greater than the inclination angle θ73 of the third region 73 of the first surface 7 in a non-limiting aspect of the present disclosure. That is, the width of the first surface 7 may be designed to be W72<W71, W73, and the inclination angle θ7 of the first surface 7 may be designed to be θ71>θ72>θ73. More specifically, in order that the inclination angle θ9 of the second surface 9 is θ92<θ91,θ93 and that the width of the first surface 7 is W72<W71, W73, the inclination angle θ7 of the first surface 7 may be designed to be θ71>θ72>θ73. When satisfying this configuration, the cutting edge strength can be further ensured in the second region 72 than in the first region 71, and the effect of reducing cutting resistance can be further ensured in the second region 72 than in the third region 73. The cutting edge 5 is therefore less likely to be fractured while maintaining good cutting performance.

The inclination angles θ71, θ72, and θ73 can be defined in the same manner as the inclination angles θ91, θ92, and θ93 described above. That is, as illustrated in FIGS. 8 to 10, the inclination angles θ71, θ72, and θ73 are respectively angles formed by the reference plane S1a perpendicular to the central axis S1 extending between the upper surface 2 and the lower surface 3, and their corresponding regions 71, 72, and 73. The inclination angle θ71 is, for example, 4.5-6 degrees. The inclination angle θ72 is, for example, 3-4.5 degrees. The inclination angle θ73 is, for example, 2-3 degrees.

Alternatively, the inclination angle θ7 of the first surface 7 may decrease as going farther from the corner part 23, from the first region 71 to the third region 73 in a non-limiting aspect of the present disclosure. When satisfying this configuration, the effect of reducing cutting resistance in the corner part 23 can be enhanced, and the cutting edge strength can be further ensured as going farther from the corner part 23. Consequently, the cutting edge 5 is less likely to be fractured while maintaining good cutting performance. The phrase that "the inclination angle θ7 of the first surface 7 decreases" denotes that, besides cases where the inclination angle θ7 decreases over the entire length of the first surface 7, the first surface 7 may include a portion in which the inclination angle θ7 remains unchanged. Alternatively, the inclination angle θ7 may decrease stepwise. When the inclination angle θ7 decreases gradually at a fixed rate, the fracture resistance of the cutting edge 5 can be suitably improved.

A decrement of the inclination angle θ72 in the second region 72 may be lower than a decrement of the inclination angle θ71 in the first region 71, and may be higher than a decrement of the inclination angle θ73 in the third region 73 in a non-limiting aspect of the present disclosure. When satisfying this configuration, the effect of reducing cutting resistance on a side of the corner part 23 can be enhanced, and the effect of improving cutting edge strength in the main cutting edge (second cutting edge 52) can be enhanced. The decrement of the inclination angle θ71 is, for example, 0.1-1.0 degree. The decrement of the inclination angle θ72 is, for example, 0.1-0.75 degrees. The decrement of the inclination angle θ73 is, for example, 0-0.5 degrees.

As illustrated in FIG. 6 and FIGS. 8 to 10, a width W92 of the fifth region 92 in the direction perpendicular to the cutting edge 5 may be greater than each of a width W91 of the fourth region 91 and a width W93 of the sixth region 93 in the direction perpendicular to the cutting edge 5 in a non-limiting aspect of the present disclosure. That is, a width of the first surface 7 may be designed to be W72<W71, W72, and a width of the second surface 9 may be designed to be W92>W91, W93. When satisfying this configuration, a rake surface (the second surface 9) located at a portion of the first surface 7 which corresponds to a region with a narrow width can be left wide, thereby ensuring the cutting edge strength. The cutting edge 5 is consequently less likely to be fractured.

Here, the width W91, the width W92, and the width W93 can be defined in the same manner as the width W71, the width W72, and the width W73 described above. That is, as illustrated in FIG. 6, the width W91, the width 92, and the width 93 are respectively lengths of their corresponding regions 91, 92, and 93 in the direction perpendicular to the cutting edge 5 in a top view. In other words, as illustrated in FIGS. 8 to 10, the width W91, the width W92, and the width W93 are respectively lengths of their corresponding regions 91, 92, and 93 in the direction along the reference plane S1a perpendicular to the central axis S1 of the insert 1. The width W91 is, for example, 0.25-0.33 mm. The width W92 is, for example, 0.33-0.41 mm. The width W93 is, for example, 0.25-0.33 mm.

The width W93 of the sixth region 93 in the direction perpendicular to the cutting edge 5 may be greater than the width W91 of the fourth region 91 in the direction perpendicular to the cutting edge 5 in a non-limiting aspect of the present disclosure. When satisfying this configuration, the fracture resistance of the cutting edge 5 can be improved.

The second surface 9 may be designed to include a plurality of inclined surfaces. Even in this case, the width W91, the width W92, and the width W93 can be defined as described above. When the second surface 9 includes the plurality of inclined surfaces, the inclination angles θ91, θ92, and θ93 can be regarded as an inclination angle of one of the plurality of inclined surfaces which is located at a side of the cutting edge 5. Thus, the foregoing effects are obtainable with the configuration that the inclined angles θ91, θ92, and θ93 have the above relationship when the second surface 9 is designed to include the plurality of inclined surfaces.

The fifth region 92 in the second surface 9 may connect to the fourth region 91 and also connect to the sixth region 93 in a non-limiting aspect of the present disclosure. When satisfying this configuration, both of the effect of reducing cutting resistance and the effect of improving the fracture resistance of the cutting edge 5 are attainable in a well-balanced manner. A different region may be located between the fourth region 91 and the fifth region 92, and between the fifth region 92 and the sixth region 93 in so far as the regions 91, 92, and 93 fulfill their function.

As illustrated in FIG. 6, a length of the second region 72 along the cutting edge 5 may be greater than a length of the first region 71 along the cutting edge 5, and may be smaller than a length of the third region 73 along the cutting edge 5 in a non-limiting aspect of the present disclosure. When satisfying this configuration, the effect of reducing cutting resistance is well compatible with the effect of improving the fracture resistance of the cutting edge 5. The length of the first region 71 along the cutting edge 5 is, for example, 0.2-0.8 mm. The length of the second region 72 along the cutting edge 5 is, for example, 0.8-2.4 mm. The length of the third region 73 along the cutting edge 5 is, for example, 3.0-10.0 mm.

As illustrated in FIG. 6, a length of the first portion 721 in the second region 72 along the cutting edge 5 may be smaller than a length of the second portion 722 in the second region 72 along the cutting edge 5. When satisfying this configuration, the fracture resistance of the cutting edge 5 is suitably improvable. The length of the first portion 721 along the cutting edge 5 is, for example, a size from the first end 72a to a boundary 723 with the second portion 722. The length of the second portion 722 along the cutting edge 5 is, for example, a size from the boundary 723 to the second end 72b. The length of the first portion 721 along the cutting edge 5 is, for example, 0.2-0.6 mm. The length of the second portion 722 along the cutting edge 5 is, for example, 0.6-1.8 mm.

For example, cemented carbide or cermet is usable as a material of the insert 1 in a non-limiting aspect of the present disclosure having the configurations described above. Examples of compositions of the cemented carbide include WC—Co, WC—TiC—Co, and WC—TiC—TaC—Co. The WC—Co is produced by adding cobalt (Co) powder to tungsten carbide (WC), followed by sintering. The WC—TiC—Co is produced by adding titanium carbide (TiC) to WC—Co. The WC—TiC—TaC—Co is produced by adding tantalum carbide (TaC) to WC—TiC—Co.

The cermet is a sintered composite material obtainable by compositing metal into a ceramic ingredient. A specific example of the cermet is one which is composed mainly of a titanium compound, such as titanium carbide (TiC) or titanium nitride (TiN).

A surface of the insert 1 may be coated with a coating film by using chemical vapor deposition (CVD) method or physical vapor deposition (PVD) method. As a composition of the coating film, there are, for example, titanium carbide (TiC), titanium nitride (TiN), titanium carbonitride (TiCN), and alumina ($Al_2O_3$).

<Cutting Tool>

The cutting tool in embodiments of the present disclosure is described below with reference to the drawings.

Figure 11:
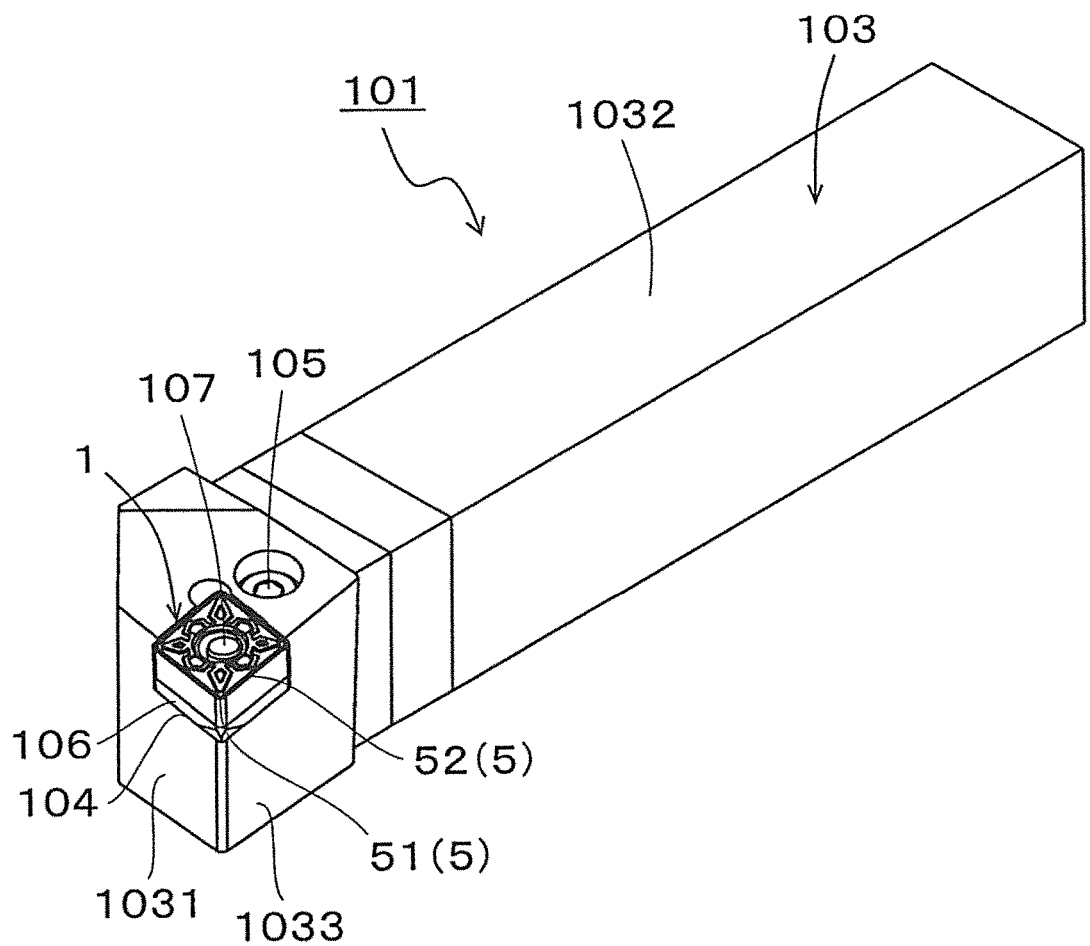
FIG. 11 is a perspective view illustrating a cutting tool in a non-limiting aspect of the present disclosure.

As illustrated in FIG. 11, the cutting tool 101 in a non-limiting aspect of the present disclosure includes the insert 1 represented by the above embodiments, and the holder 103 designed to attach the insert 1 thereto.

The holder 103 in a non-limiting aspect of the present disclosure has a long narrow bar shape. An end portion (tip portion) of the holder 103 includes an insert pocket 104 to which the insert 1 is attached. The insert pocket 104 is a portion designed to receive the insert 1, and opens into a front end surface 1031 and two side surfaces 1032 and 1033 in the holder 103. For example, steel or cast iron is usable as material of the holder 103. Of these materials, steel with high rigidity may be used.

The following is a method of attaching the insert 1 to the holder 103.

The insert 1 is attached to the insert pocket 104 so that the cutting edge 5 projects outward from an outer periphery of the holder 103. More specifically, the insert 1 is attached to the holder 103 so that the second cutting edge 52 is usable as the major cutting edge. That is, the second cutting edge 52 is located at a side of the side surface 1033 of the holder 103, and the first cutting edge 51 is located at a corner part formed by the front end surface 1031 and the side surface 1033 as illustrated in FIG. 11.

The insert 1 is fixed to the insert pocket 104 by a clamp member 107 in a non-limiting aspect of the present disclosure. Specifically, a screw 105 is inserted into a through hole of the clamp member 107 in a state in which a tip of the clamp member 107 is inserted into the through hole 6 of the insert 1. Screw parts are engaged with each other by inserting a tip of the screw 105 into a screw hole (not illustrated) formed in the holder 103, so that the tip of the clamp member 107 presses the insert 1 against the holder 103. Thus, the insert 1 is attachable to the holder 103.

A sheet member 106 is disposed between the insert pocket 104 and the insert 1 in a non-limiting aspect of the present disclosure. The insert 1 is therefore less likely to be fractured or the like. Various shapes are usable for the sheet member 106. A sheet member that is a general purpose product is suitable usable under a wider range of cutting conditions in a non-limiting aspect of the present disclosure.

The cutting tool 101 in a non-limiting aspect of the present disclosure includes the insert 1 having the above characteristic configurations, and the cutting edge 5 is therefore less likely to be fractured even under cutting conditions, such as the high feed machining under large cutting loads. This leads to improved tool life.

<Method of Manufacturing Machined Product>

A method of manufacturing a machined product in embodiments of the present disclosure is described below with reference to the drawings.

Figure 12:
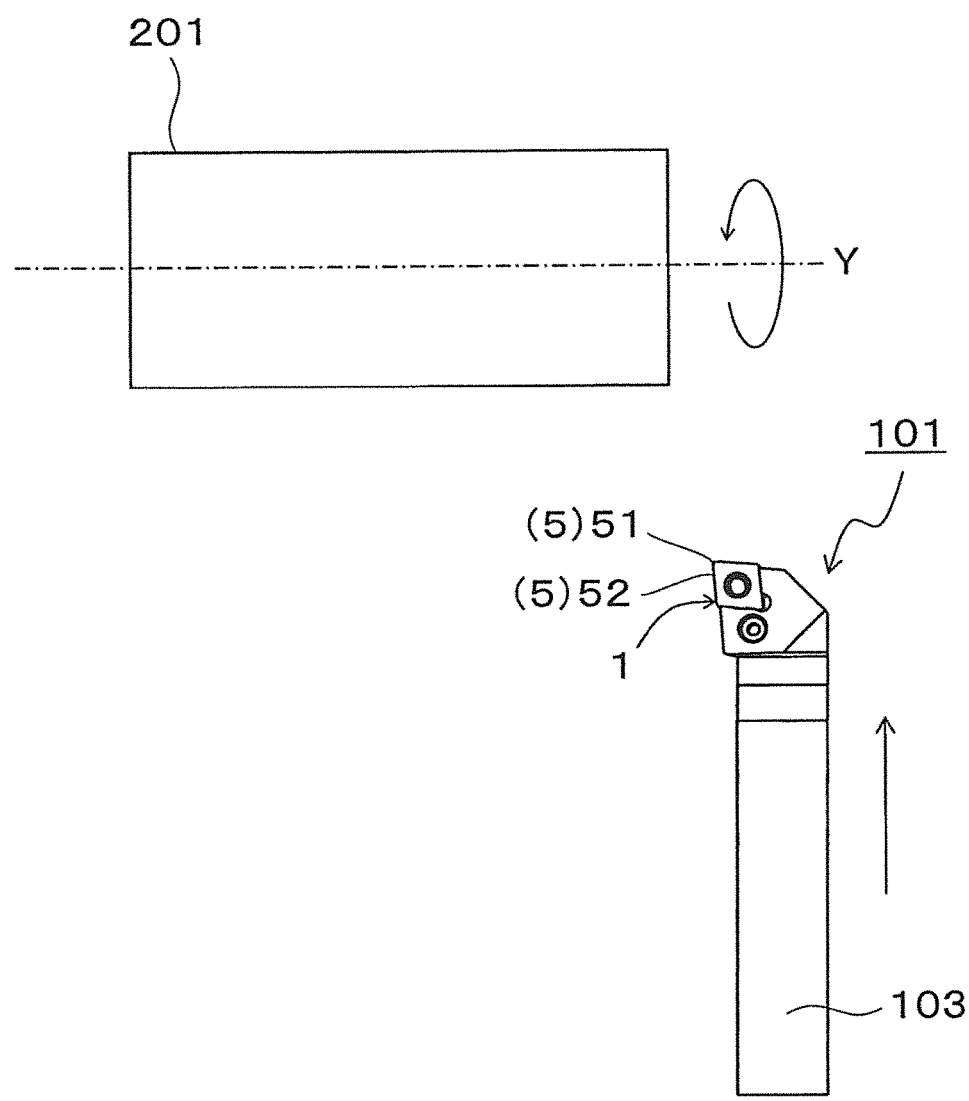
FIG. 12 is a schematic diagram illustrating a step in a method of manufacturing a machined product in a non-limiting aspect of the present disclosure.
Figure 13:
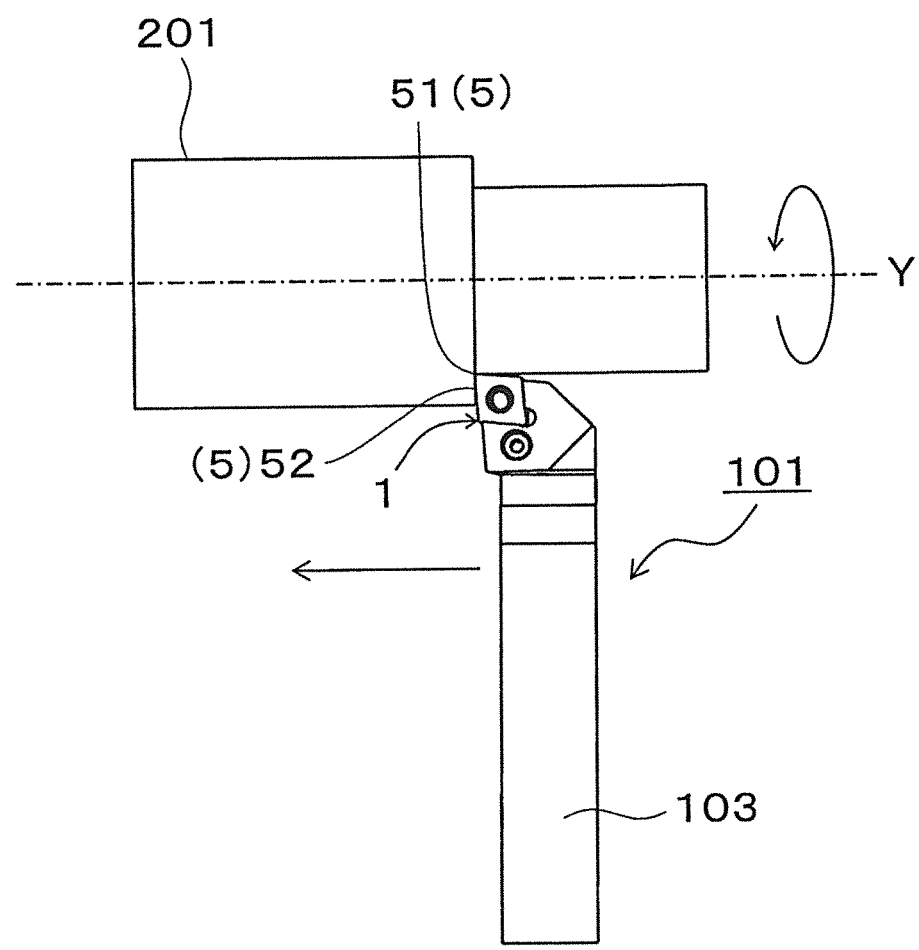
FIG. 13 is a schematic diagram illustrating a step in the method of manufacturing a machined product in a non-limiting aspect of the present disclosure.
Figure 14:
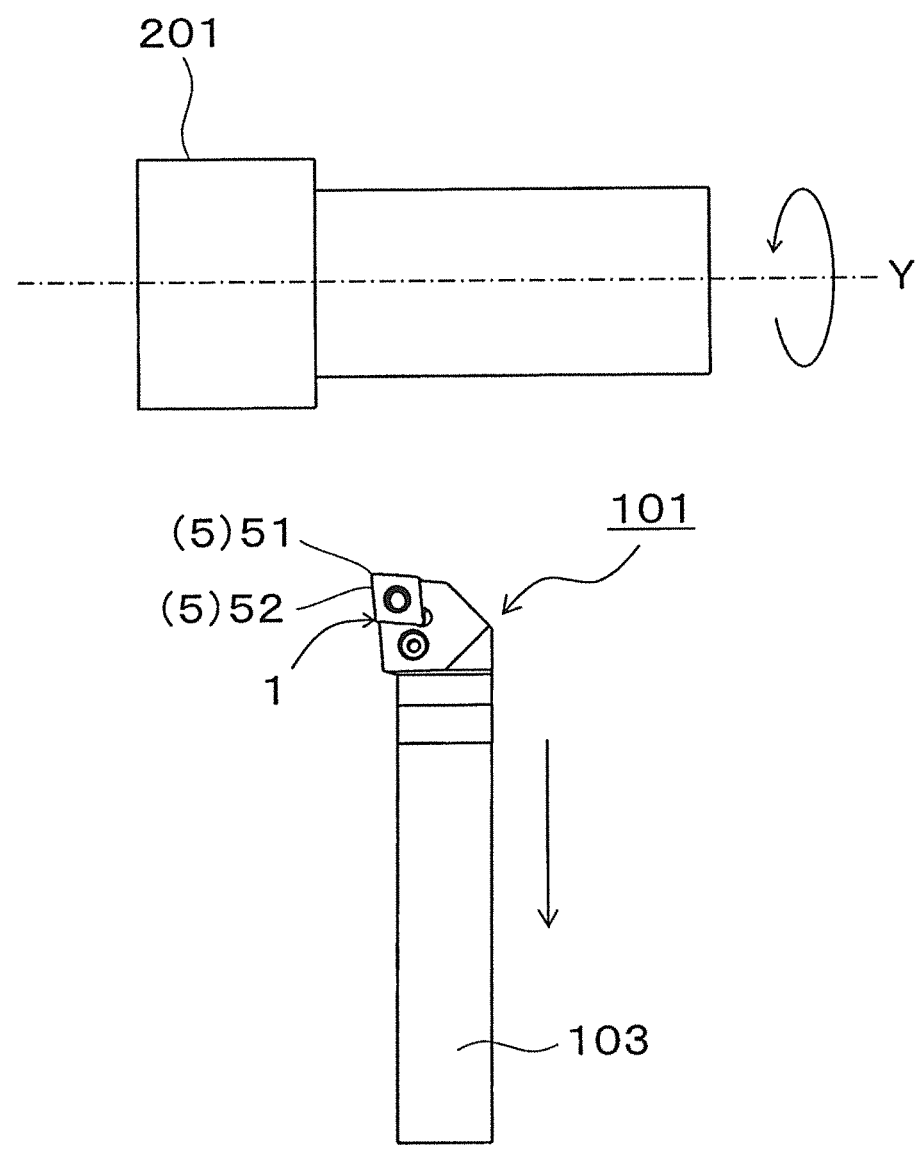
FIG. 14 is a schematic diagram illustrating a step in the method of manufacturing a machined product in a non-limiting aspect of the present disclosure.

The manufacturing method in a non-limiting aspect of the present disclosure includes the following steps:

(1) bringing the cutting tool 101 represented by the above embodiments relatively near a workpiece 201 in a state in which the workpiece 201 is rotated as illustrated in FIG. 12;

(2) bringing the cutting edge 5 of the cutting tool 101 into contact with the workpiece 201 being rotated as illustrated in FIG. 13; and (3) moving the cutting tool 101 away from the workpiece 201 as illustrated in FIG. 14.

With the method of manufacturing a machined product in a non-limiting aspect of the present disclosure, the cutting tool 101 is capable of providing good cutting performance even during the high feed machining under large cutting loads because the cutting tool 101 includes the insert 1 having the above characteristic configurations.

FIG. 12 illustrates a situation where the cutting tool 101 is brought near the workpiece 201 by fixing a rotation axis Y of the workpiece 201 and by rotating the workpiece 201. FIG. 13 illustrate a situation where a cutting process is carried out by bringing the cutting tool 101 into contact with the workpiece 201 in a state in which the workpiece 201 is rotated. FIG. 14 illustrates a situation where the workpiece 201 is rotated and the cutting tool 101 is moved away from the workpiece 201 in a state in which the rotation axis Y is fixed. Although the workpiece 201 is rotated and the cutting tool 101 is moved in the state in which the rotation axis Y is fixed in each of the steps in a non-limiting aspect of the present disclosure, there is, of course, no intention to limit thereto.

For example, the workpiece 201 may be brought near the cutting tool 101 in the step (1). Similarly, the workpiece 201 may be moved away from the cutting tool 101 in the step (3). When the cutting process is continued, the step of bringing the cutting edge 5 of the insert 1 into contact with different portions of the workpiece 201 may be repeated, while keeping the workpiece 201 rotated. When the cutting edge 5 being used is worn out, an unused cutting 5 may be used by rotating the insert 1 180 degrees around the central axis S1.

Examples of material of the workpiece 201 include carbon steel, alloy steel, stainless steel, cast iron, and nonferrous metals.

While various non-limiting aspects of the present disclosure have been illustrated and described above, the present disclosure is not limited to the foregoing embodiments. It is, of course, possible to make any optional ones in so far as they do not depart from the gist of the present disclosure.

Singular forms "a", "an" and "the" in the entirety of the present disclosure include plural forms thereof unless clearly indicated not being so from the context.

DESCRIPTION OF THE REFERENCE NUMERALS 1 cutting insert (insert)
2 upper surface
  21 first side part
  22 second side part
  23 corner part
3 lower surface
4 side surface
5 cutting edge
  51 first cutting edge
  52 second cutting edge
  53 third cutting edge
6 through hole
7 first surface
  71 first region
  72 second region
    72a first end
    72b second end
    721 first portion
    721 second portion
    723 boundary
  73 third region
9 second surface
  91 fourth region
  92 fifth region
  93 sixth region
11 third surface
101 cutting tool
103 holder
  103 front end surface
  1032 side surface
  1033 side surface
104 insert pocket
105 screw
106 sheet member
107 clamp member
201 workpiece

What is claimed is:

1. A cutting insert, comprising:
an upper surface comprising:
  a first side part;
  a second side part; and
  a corner part located between the first side part and the second side part;
a lower surface located on a side of the cutting insert opposite to the upper surface;
a side surface located between the upper surface and the lower surface; and
a cutting edge located at an intersection of the upper surface and the side surface, wherein
the upper surface further comprises a first surface configured as a land surface bordering the cutting edge, a second surface configured as a rake surface which is located further inward than and bordering the first surface and only inclined toward the lower surface as going farther from the first surface, and a third surface which is located further inward than and bordering the second surface;
the first surface extending from the cutting edge to the second surface;
the second surface extending from the first surface to the third surface;
the cutting edge comprises a first cutting edge located at the corner part and a second cutting edge located at the first side part;
the first surface comprises a first region bordering the first cutting edge, a second region adjacent to the first region and bordering the cutting edge, and a third region which is adjacent to the second region and bordering the second cutting edge;
a width of the first region in a direction perpendicular to the cutting edge in the first region, a width of the second region in a direction perpendicular to the cutting edge in the second region, and a width of the third region in a direction perpendicular to the cutting edge in the third region define corresponding widths of the first surface from the cutting edge to the second surface;
the width of the second region is less than each of the width of the first region and the width of the third region;
the second surface comprises a fourth region located further inward than and bordering the first region, a fifth region located further inward than and bordering the second region, and a sixth region located further inward than and bordering the third region;
a width of the fourth region in a direction perpendicular to the cutting edge in the fourth region, a width of the fifth region in a direction perpendicular to the cutting edge in the fifth region, and a width of the sixth region in a direction perpendicular to the cutting edge in the sixth region define corresponding widths of the second surface from the first surface to the third surface;
the width of the fifth region in the direction perpendicular to the cutting edge in the fifth region is greater than each of the width of the fourth region in the direction perpendicular to the cutting edge in the fourth region and the width of the sixth region in the direction perpendicular to the cutting edge in the sixth region;

a maximum inclination angle of the fourth region and a maximum inclination angle of the sixth region have a greater inclination angle than a maximum inclination angle of the fifth region;

the first surface is inclined toward the lower surface as going farther from the cutting edge;

every inclination angle of the first surface is less than every inclination angle of the second surface; and every inclination angle of the third surface is less than every inclination angle of the second surface.

2. The cutting insert according to claim 1, wherein the second region comprises:

a first portion which is adjacent to the first region and borders the first cutting edge, and a second portion which is adjacent to the third region and borders the second cutting edge.

3. The cutting insert according to claim 2, wherein a width of the first portion in a direction perpendicular to the cutting edge in the first portion decreases as going farther from the first region, and a width of the second portion in a direction perpendicular to the cutting edge in the second portion decreases as going farther from the third region.

4. The cutting insert according to claim 3, wherein a decrement of the width of the first portion is greater than a decrement of the width of the second portion.

5. The cutting insert according to claim 1, wherein the width of the third region in the direction perpendicular to the cutting edge in the third region is greater than the width of the first region in the direction perpendicular to the cutting edge in the first region.

6. The cutting insert according to claim 1, wherein the maximum inclination angle of the sixth region is equal to the maximum inclination angle of the fourth region.

7. The cutting insert according to claim 1, wherein an inclination angle of the second region is less than an inclination angle of the first region and greater than an inclination angle of the third region.

8. The cutting insert according to claim 7, wherein an inclination angle of the first surface decreases as going farther from the corner part, from the first region to the third region.

9. The cutting insert according to claim 7, wherein a decrement of the inclination angle in the second region is lower than a decrement of the inclination angle in the first region, and is higher than a decrement of the inclination angle in the third region.

10. The cutting insert according to claim 1, wherein a length of the second region along the cutting edge is greater than a length of the first region along the cutting edge and is smaller than a length of the third region along the cutting edge.

11. A cutting tool, comprising:

the cutting insert according to claim 1; and a holder designed to attach the cutting insert to the holder.

12. A method of manufacturing a machined product, comprising:

rotating a workpiece;

bringing the cutting tool according to claim 11 into contact with the workpiece being rotated; and moving the cutting tool away from the workpiece.

13. The cutting insert according to claim 1, wherein the fifth region has a single inclination angle throughout an entirety of the fifth region equal to the maximum inclination angle of the fifth region.

* * * * *